United States Patent [19]

Stewart et al.

[11] Patent Number: 5,332,827

[45] Date of Patent: Jul. 26, 1994

[54] DEUTERATED ORGANIC SALTS USEFUL IN NONLINEAR OPTICAL APPLICATIONS

[75] Inventors: Kevin R. Stewart, Schenectady; Eugene P. Boden, Scotia; Christopher P. Yakymyshyn, Saratoga Springs, all of N.Y.

[73] Assignee: General Electric Company, Schenectady, N.Y.

[21] Appl. No.: 109,897

[22] Filed: Aug. 23, 1993

Related U.S. Application Data

[62] Division of Ser. No. 67,929, May 27, 1993.

[51] Int. Cl.$^5$ .......................................... C07D 211/70
[52] U.S. Cl. ................................................... 546/347
[58] Field of Search ........................................ 546/347

[56] References Cited

U.S. PATENT DOCUMENTS 5,094,553  3/1992  Yakymyshyn et al. ............. 385/122
5,194,984  3/1993  Boden et al. ........................ 359/321

OTHER PUBLICATIONS

Marder et al, *Science*, vol. 246, pp. 626–628, Aug. 1989.

*Primary Examiner*—C. Warren Ivy
*Assistant Examiner*—Zinna N. Davis
*Attorney, Agent, or Firm*—William H. Pittman

[57] ABSTRACT

Deuterated organic salts useful in nonlinear optical applications are disclosed herein. More particularly, optoelectronic devices and systems are prepared from said deuterated organic salts and the preferred salt is perdeuterated 4'-dimethylamino-4-methylstilbazolium p-toluenesulfonate.

4 Claims, No Drawings

DEUTERATED ORGANIC SALTS USEFUL IN NONLINEAR OPTICAL APPLICATIONS

The following invention was made with government support via contract number F49620-91-C-0075 which was awarded by the United States Air Force. The government has certain rights in this invention.

This application is a division of application Ser. No. 08/067,929, filed May 27, 1993 now allowed.

FIELD OF THE INVENTION

This invention relates to optically nonlinear chemical compounds useful in the fabrication of optoelectronic devices and systems. More particularly, deuterated organic salts are prepared for use in nonlinear optical applications.

BACKGROUND OF THE INVENTION

The optics and electronics industries rely upon inorganic compounds for fabrication of various components. However, these industries may benefit largely from the plethora of organic compounds, both known and unknown. Of the many potential applications of organic compounds to the above-mentioned industries, many relate to the electro-optic effect as described by Kerr (1875) and Pockels (1906). Additionally, frequency doubling by second harmonic generation (SHG) is often considered. SHG may be defined as the doubling of light's fundamental frequency.

A test to study SHG has been developed (Kurtz and Perry, 1968) which analyzes, for instance, the noncentrosymmetric crystal structure of organic compounds. Organic compounds which possess a noncentrosymmetric structure are generally said to be nonlinear.

Organic nonlinear optical materials displaying high SHG properties are potentially useful in applications which require high speed optical modulators. Such applications include high speed long distance data links and electric field sensors for use in electromagnetically noisy environments. In addition, such materials provide efficient wavelength shifting capability for optical and infrared remote sensing (e.g., of pollutant particulate concentration) and diode laser frequency doubling for optical data storage.

A common obstacle with nonlinear optical materials, such as nondeuterated 4'-dimethylamino-4-methylstilbazolium toluenesulfonate, is the existence of a group of infrared absorbances in the 1600–2000 nm region, a region which is extremely useful for optical applications like long distance optical fiber communications and eye-safe remote sensing. It is of increasing interest to prepare nonlinear optical materials which, while maintaining their conventional optical properties, do not exhibit infrared absorbances in the 1600–2000 nm region. Such absorbances are an obstacle since they interfere with, not only the optical properties, but the stability of the nonlinear optical materials as well. The instant invention, therefore, is based on the preparation of deuterated organic salts, such as the compound perdeuterated 4'-dimethylamino-4-methylstilbazolium p-toluenesulfonate and homologs thereof, which do not display infrared absorption in the 1600–2000 nm region. In the instant invention, deuterated organic salts are defined as salts containing deuterium including perdeuterated salts. Also included are optical devices comprising the same.

DESCRIPTION OF THE PRIOR ART

Accordingly, organic compounds having large SHG properties are known in the art. Several, including 4'-dimethylamino-4-methylstilbazolium p-toluenesulfonate, are disclosed in Marder et al., Science 245, 626–628 (1989). It has also been discovered that such compounds can be converted to a hydrated form deplete of SHG properties. Both the hydrated form as well as the anhydrous form, like those disclosed in U.S. Pat. Nos. 5,094,553 and 5,194,984, may be used in various types of optical applications.

In U.S. Pat. No. 5,094,553, a chemical compound having optically second order nonlinear properties is disclosed and employed in optical materials. Said chemical compound comprises two different crystalline forms and a variety of indices of refraction.

Additionally, in U.S. Pat. No. 5,194,984 an optically nonlinear device and stilbazolium salt compound are disclosed. Nonetheless, the instant invention is patentably distinguishable from the above-mentioned patents since, among other reasons, it comprises deuterated homologs of organic salts, wherein C-H units are selectively replaced by C-D units.

Still other investigators have focused their attention on shifting infrared absorbance spectrum of inorganic compounds. For instance, in CRC Handbook of Laser Science and Technology, Vol. 3, 1986, 114, it has been observed that the substitution of deuterium for hydrogen in $KH_2PO_4$ leads to a shift in infrared absorbance spectrum of about 400 nm. However, the instant invention is patentably distinguishable from the above-mentioned reference, since again, it employs deuterated homologs of organic salts in which C-H units are selectively replaced by C-D units.

SUMMARY OF THE INVENTION

The present invention therefore is a group of deuterated homologs of organic salts in which the C-H units of the structure are selectively replaced by C-D units. Also disclosed is an optical waveguide comprising the same. The deuterated organic salts of the instant invention comprise the formula

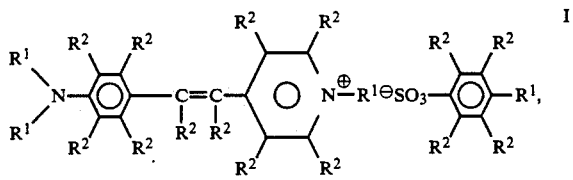

wherein each $R^1$ is independently an aliphatic, alicyclic or aromatic radical; however, methyl groups in which from 0 to 3 of the hydrogens are replaced by deuterium are preferred. $R^2$ is deuterium.

It is most preferred that the deuterated organic salt is perdeuterated 4'-dimethylamino-4-methylstilbazolium p-toluenesulfonate comprising the formula

II

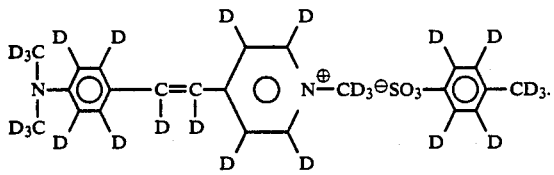

The structures depicted hereinabove are not limited to any sterioisomeric (cis or trans) arrangement. However, the trans-isomer is preferred in nonlinear optical applications. The cis- and trans-isomers may be separated by conventional methods such as fractional crystallization or flash column chromatography. Furthermore, the deuterated organic salts of the instant invention may be either crystalline or amorphous as well as hydrous or anhydrous.

The additional features and advantages of the invention will be made evident upon reference to the following detailed description.

DETAILED DESCRIPTION OF THE PREFERRED EMBODIMENT

A novel feature of the instant deuterated organic salts is the absence of infrared absorbances in the 1600-2000 nm region. Such absorbances are the result of overtone and combination bands for in plane and out of plane bending deformations of aromatic C-H units. It has been discovered that the selective substitution of deuterium for hydrogen results in the removal of the above-mentioned absorbances, whereby the resulting deuterated organic salts maintain their conventional optical/SHG properties.

Hence, the instant invention provides yet another novel group of chemical compounds useful in the fabrication of optical materials. The light transmitting properties of said compound are based on different crystalline structures and degrees of hydration thereof. In the instant invention the hydrate form does not possess SHG properties whereas the anhydrous form does. Also provided are optical materials incorporating the group of chemical compounds described herein.

Electro-optic modulators, may be prepared from the instant deuterated organic salt compounds of the instant invention since they possess light transmitting properties which can be varied by application of an electric field.

Additionally, optical waveguides may be prepared from the deuterated organic salt compounds of the instant invention since they possess light transmitting properties resulting from different crystalline structures. The anhydrous form (first crystalline form), which possesses SHG properties, may be employed as the core material of the optical waveguide. Additional characteristics of the anhydrous form are its asymmetric arrangement, high degree of electron delocalization as well as a low energy difference between the ground and first excited states. To the contrary, the hydrated form (second crystalline form) has a lower index of refraction than its anhydrous counterpart and it is capable of serving as a cladding material for the instant waveguides. The cladding material may entirely or partially enclose the core material.

Thus, it is possible for the core and cladding material to comprise the same substance in different crystalline forms. Notwithstanding, it is not a requirement that the core and cladding material be the same compound. Further, it is possible in many instances to produce the core material by selective application of heat (e.g., by laser writing) to the hydrated material.

Therefore, in addition to the novel deuterated organic salts of the instant invention, an additional feature is optical waveguides prepared from the same. Said waveguides contain a light transmitting core comprising a chemical compound in an optically second order nonlinear (high SHG) anhydrous form, and a cladding material comprising said chemical compound in hydrated form having a lower index of refraction than the core.

Furthermore, the instant invention is not intended to limit said waveguides to entirely deuterated core and cladding materials. Said core and cladding materials may employ deuterated compounds in combination with nondeuterated compounds.

Deuterated Organic Salts Preparation

The deuterated organic salts of the instant invention, such as perdeuterated 4-dimethylamino-4-methylstilbazolium p-toluenesulfonate, may be prepared via the reaction of perdeuterio methyl p-toluenesulfonate with perdeuterio 4-picoline (perdeuterio 4-methylpyridine) followed by condensation with perdeuterio p-dimethylaminobenzaldehyde, using a lower alkanol as a solvent. The hydrated form may be obtained by dissolving the anhydrous compound in water or in a suitable organic solvent (e.g., methanol or dimethyl sulfoxide) containing at least about 5% water by volume. Subsequently, crystals can be grown via solution supersaturating or supercooling as well as other conventional methods.

The anhydrous deuterated organic salt form crystallizes in platelets with mirror-like parallel facets constituting alternate cation and anion layers. Chromophores present in neighboring sheets form a "herringbone-type" pattern. The resulting compound displays superior thermal stability and no apparent change in optical properties is demonstrated subsequent to heating for about 200 hours in air at about 160° C.

The hydrated deuterated organic salt form may be analyzed via thermoparametric means. Differential scanning calorimetry is expected to show that the hydrated form corresponds generally to a monohydrate. A unit cell thereof may be examined by x-ray diffraction which is expected to indicate that the chromophore is centrosymmetrically ordered around the water molecule since this is the case for nondeuterated compounds. Said hydrated form may be converted to a dehydrated anhydrous form by heating to a temperature in the range of about 110°-145° C.

Waveguide Preparation

The optical waveguides described hereinabove may be readily produced by depositing a film of hydrated deuterated organic salt, such as perdeuterated 4'-dimethylamino-4-methylstilbazolium p-toluenesulfonate, in preferably single crystal form on a suitable substrate. The anhydrous deuterated organic salt required for high SHG properties may be obtained via heating a selected region of said hydrated deuterated organic salt. The resulting anhydrous salt serves as the core of the waveguide.

The substrates employed in supporting the waveguide are conventional substrates such as a standard silicon substrate, fused silica, polyimides and polymethacrylates. The above substrates may also be metallized for employment in the invention.

Deposition of the hydrated deuterated organic salt on the substrate may be conducted as described hereinabove. To convert a selected region of hydrated form to the anhydrous optically non-linear form, any suitable local heating method may be employed. It is frequently convenient to use a laser beam of predetermined diameter, typically about 20–70 microns.

It is often found that the anhydrous deuterated organic salt formed in the localized heating region is polycrystalline rather than in single crystal form. However, the polycrystalline form may be converted to single crystal material by art-recognized operations such as annealing. Alternatively, the scanning rate with the laser may be regulated to produce the single crystal anhydrous deuterated organic salt.

The following examples are provided to further facilitate the understanding of the invention and they are not intended to limit the instant invention. The deuterated materials utilized were purchased from Cambridge Isotope Laboratories.

EXAMPLE 1

25 grams of perdeuterated toluene and 50 g of perdeuterated sulfuric acid were placed in a 200 mL round-bottom flask and attached to a reflux condenser. The resulting mixture was heated at about 170° C. for about 5 hours. A warm solution was produced and poured into 100 mL of deuterium oxide and stirred vigorously to produce an acidic solution. Said acidic solution was partially neutralized by the addition of sodium bicarbonate to a total of 15 g. 40 g of sodium chloride was subsequently added and the resulting mixture was heated until boiling to completely solubilize the salt to produce solution. The solution was cooled in an ice-water bath and crystalline perdeuterated sodium p-toluenesulfonate was collected via filtration. The white solid was dried overnight in vacuo to yield 26.5 g of deuterated product (perdeuterated sodium p-toluenesulfonate).

EXAMPLE 2

2.0 grams (20.0 mmole) of perdeuterated 4-picoline and 2.9 g (20.0 mmole) of perdeuterated methyliodide were combined with 100 mL of absolute ethanol in a 250 mL flask and heated at reflux for 4 hours. The solvent was removed and a white solid was dried in vacuo. 2.483 g (10.74 mmole) of the white solid was transferred to a 250 mL flask containing 1.811 g (11.3 mmole) of perdeuterated 4-dimethylamino benzaldehyde and 100 mL of methanol. 100 μL of piperidine was added and the resulting mixture was refluxed overnight. The reaction mixture was deep red and was cooled to about 5°–10° C. Subsequently, the mixture was filtered and 3.25 grams of deuterated solid product was recovered (perdeuterated 4'-dimethylamino-4-methylstilbazolium iodide).

EXAMPLE 3

3.0 grams (15.0 mmole) of perdeuterated p-toluenesulfonate was placed in a 250 mL flask with 200 mL of diethyl ether and 5 ml of 35% by weight hydrochloric acid. The mixture was stirred for 4 hours, separated and reduced to yield 20 grams of white solid. The solid was combined with 2.6 g (11.2 mmole) of silver I oxide and 200 mL of acetonitrile. The resulting mixture was stirred in the absence of light for about 4 hours. It was subsequently filtered to remove solvent to yield 2 grams of perdeuterated silver salt. The salt was placed in a 500 mL flask with 2.7 grams of perdeuterated 4'-dimethylamino-4-methylstilbazolium iodide and 200 mL of methanol. The resulting mixture was stirred for 24 hours at ambient temperature. It was subsequently filtered to remove solvent and recover 2.94 g of perdeuterated 4'-dimethylamino-4-methylstilbazolium p-toluenesulfonate.

What is claimed is:

1. A deuterated organic salt having the formula

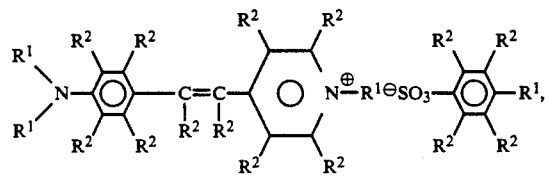

wherein each $R^1$ is independently an aliphatic, alicyclic or aromatic radical and $R^2$ is deuterium.

2. A deuterated organic salt in accordance with claim 1, wherein each $R^1$ is independently
   (i) —$CH_3$, or
   (ii) —$CDH_2$, or
   (iii) —$CD_2H$, or
   (iv) —$CD_3$.

3. A deuterated organic salt in accordance with claim 1, wherein said salt has the formula

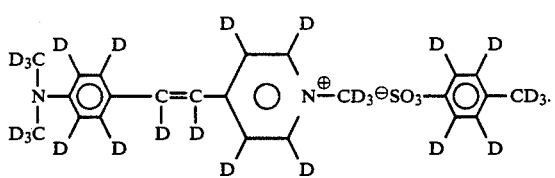

4. A deuterated organic salt in accordance with claim 1, wherein said salt does not exhibit infrared absorbances in the 1600–2000 nm region.

* * * * *